UNITED STATES PATENT OFFICE.

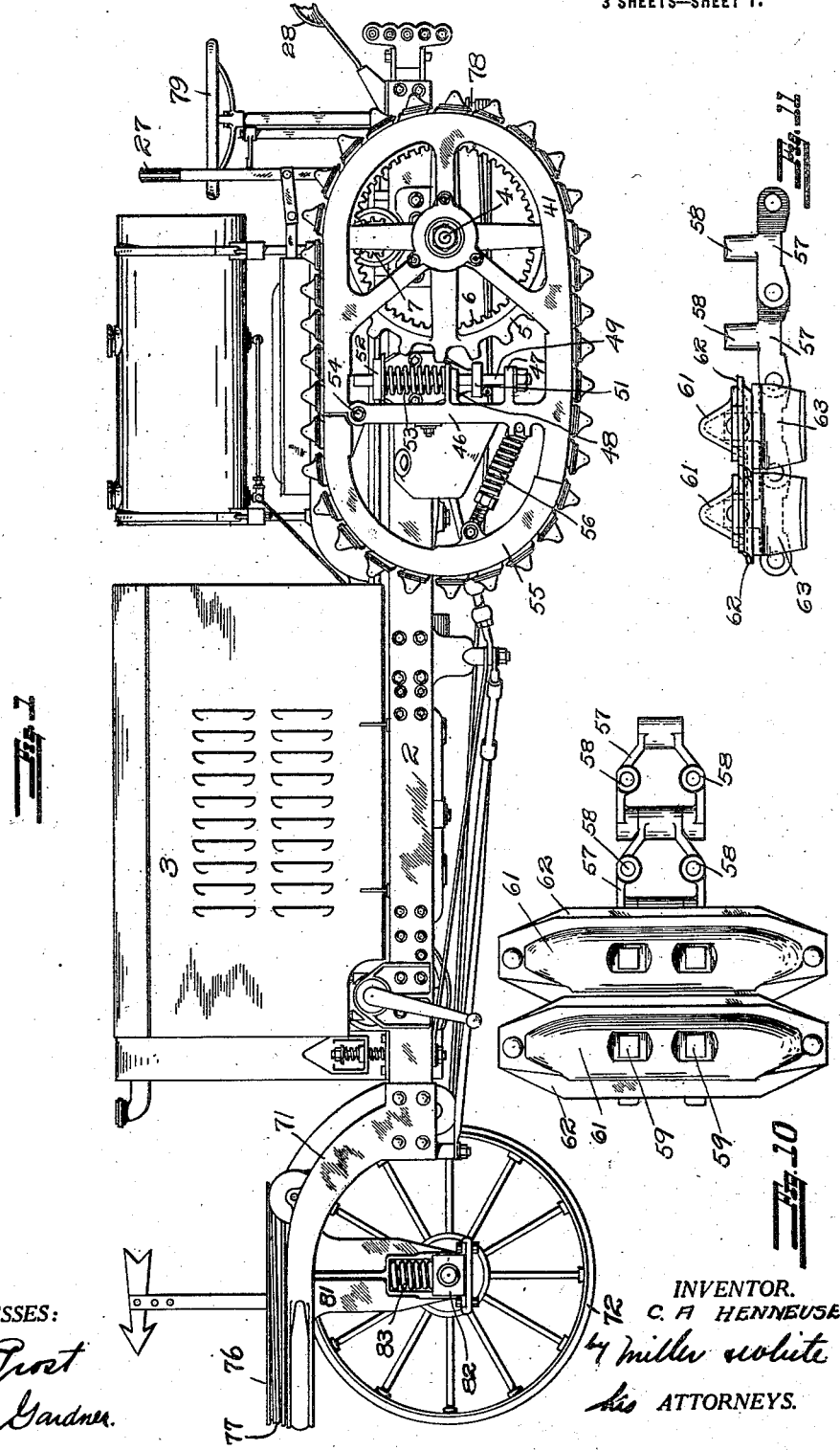

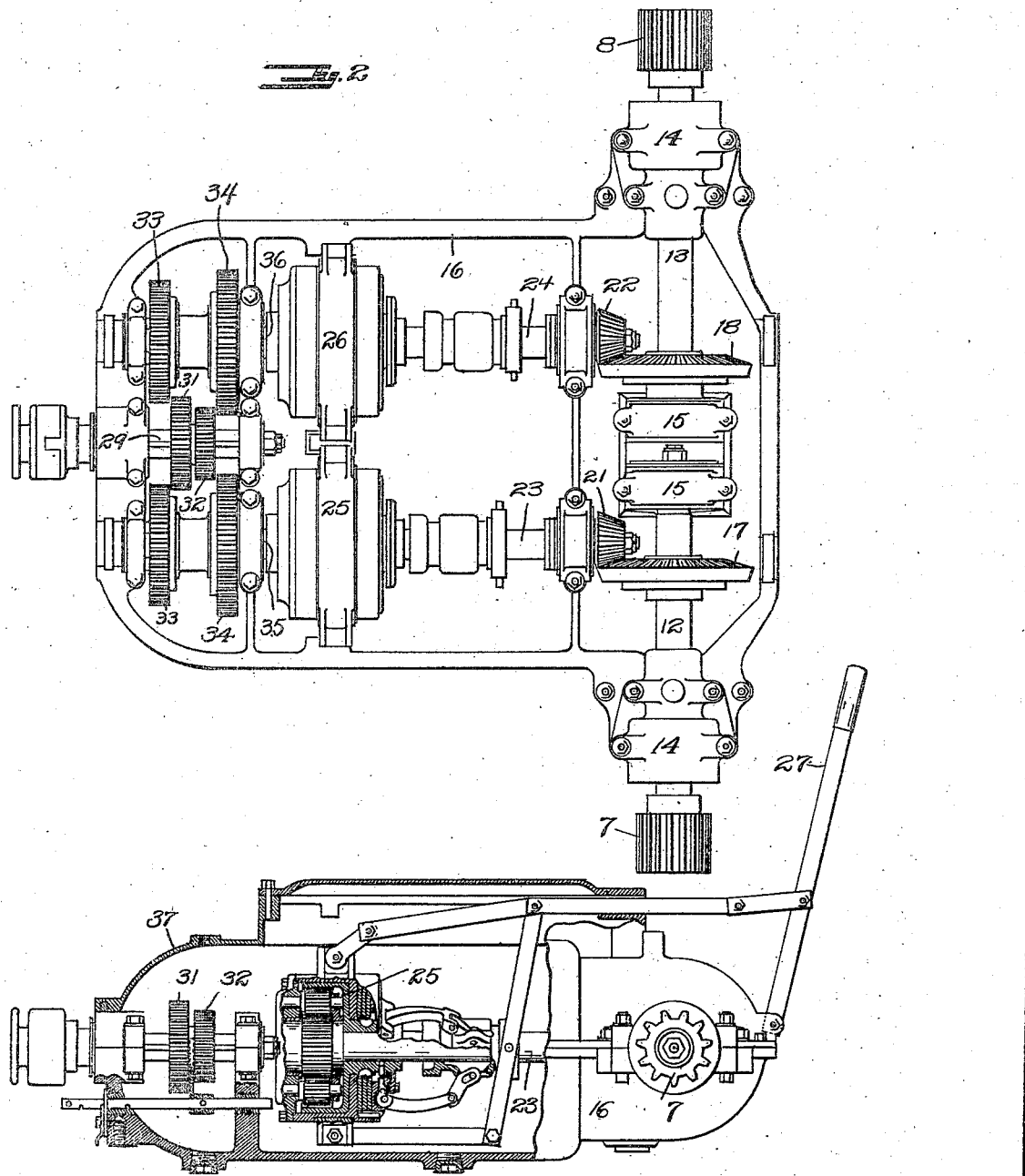

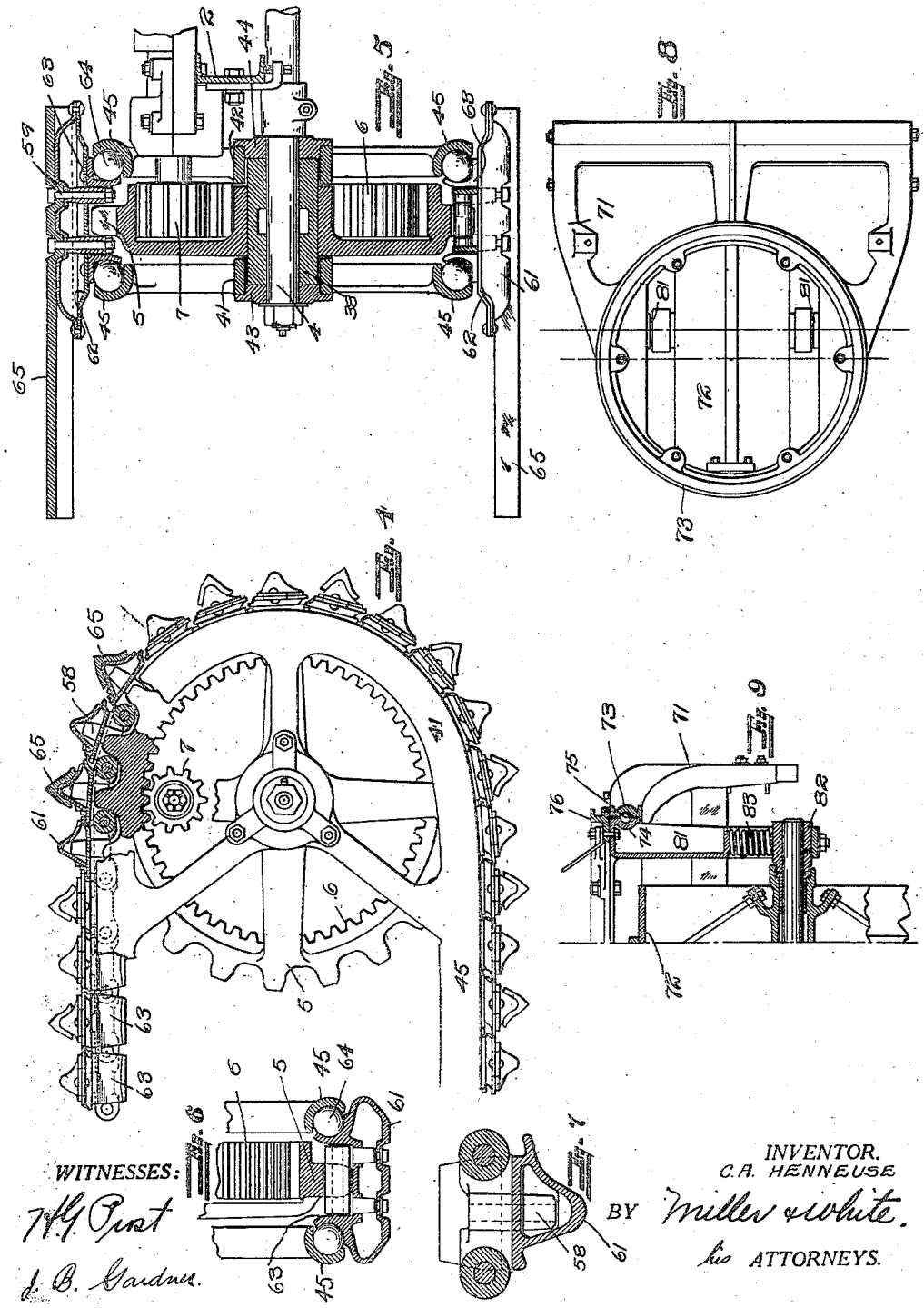

CLARENCE A. HENNEUSE, OF MARYSVILLE, CALIFORNIA, ASSIGNOR TO THE YUBA CONSTRUCTION COMPANY, A CORPORATION OF CALIFORNIA.

TRACTOR.

1,192,423.   Specification of Letters Patent.   Patented July 25, 1916.

Application filed August 10, 1914. Serial No. 855,954.

*To all whom it may concern:*

Be it known that I, CLARENCE A. HENNEUSE, a citizen of the United States, and a resident of Marysville, Yuba county, State of California, have invented certain new and useful Improvements in Tractors, of which the following is a specification.

The invention relates to tractors of the track-laying type.

One of the objects of the invention is to provide an efficient, compact and economical tractor.

Another object of the invention is to provide a tractor which is operable on wet or muddy ground.

A further object of the invention is to provide a tractor which is turnable in a circle of comparatively small diameter.

A further object of the invention is to provide an improved steering wheel arrangement.

A further object of the invention is to provide an improved tractor tread.

The invention possesses other advantageous features, some of which, with the foregoing, will be set forth at length in the following description, where I shall outline in full that form of the invention which I have selected for illustration in the drawings accompanying and forming part of the present specification.

In the drawings I have shown only one specific form of my generic invention, but it is to be understood that I do not limit myself to such form because my invention may be embodied in a multiplicity of forms, each being a species of my said invention.

It is also to be understood that by the claims succeeding the description of my invention, I desire to cover the invention in whatever form it may be embodied.

Tractors of the type of my invention are particularly designed to run over plowed or unplowed fields or other rough and broken surfaces and country roads, and must be capable of operating over such surfaces and roads, whether they are in a dry, dusty condition, or in a wet, muddy condition. The tractor chain and tread, subjected to these various conditions and contacting directly with the surface, must be of such construction that its operation is not materially affected by the presence of dust or mud, and at the same time must be so constructed that it has traction on the surfaces. The tread of the present invention is designed to meet these conditions and is particularly efficient in connection with wet and muddy surfaces. Much ground is of an adobe nature and when wet clings to the treads in such manner, that if it were not removed, would soon accumulate to such an extent as to render the tractor inoperative. The tread of my invention is constructed to cause the adhering mud to be released and removed, and for this reason partly, the tractor is capable of operation over muddy surfaces.

It is also desirable that a tractor be able to turn in a narrow circle and this desire is principally evident at the end of a run in a field, when the tractor is drawing plows, reapers or other agricultural implements. This I accomplish by connecting each tractor chain separately with the engine and by arranging a releasing and reversing mechanism in each connection, thereby allowing one chain to be driven ahead and the other backward, which operation causes the tractor to turn in a small circle.

Other features of the tractor will become apparent from the following description, in which reference is had to the accompanying drawings, in which—

Figure 1 is a side elevation of the tractor of my invention. Fig. 2 is a plan view of the tread driving and reversing mechanism. Fig. 3 is a side view partly in section of the driving and reversing mechanism. Fig. 4 is a side view, partly in section, of the tractor chain, tread plates, ball race and driving gear. Fig. 5 is a vertical transverse section through a driving sprocket and tractor chain. Fig. 6 is a fragmentary transverse section of a driving sprocket, showing a modified form of tread. Fig. 7 is a cross-section of one link of the modified form of tread. Fig. 8 is a plan or top view of the steering wheel head. Fig. 9 is a vertical section through one half of the steering wheel and its mounting. Fig. 10 is a plan view of a portion of the tractor chain and treads. Fig. 11 is a side view of a portion of the tractor chain and treads.

The tractor comprises a frame 2 of suitable and sturdy construction upon which is mounted an internal combustion engine, which is covered by the hood 3. Secured to the frame adjacent its rear end is the transverse shaft or axle 4, upon the opposite ends of which are mounted the sprockets 5, there being a sprocket on each side of the tractor. Each sprocket is provided with an internal gear 6, which are engaged respectively by the pinions 7 and 8, secured to the transverse shafts 12 and 13. The shafts 12 and 13 are journaled in suitable bearings 14—15 arranged on the housing or case 16, which is secured to the main frame. The shafts are independently rotatable, and for this purpose each shaft is provided with a bevel gear 17—18 which are respectively engaged by the driving pinions 21—22, secured to the longitudinal drive shafts 23—24, which are journaled in suitable bearings in the housing 16. The shafts 23—24 are provided respectively with releasing and reversing gear mechanisms 25—26, so that either shaft may be disconnected from the engine or the direction of rotation of either shaft may be reversed with relation to the other shaft, or the direction of rotation of both shafts may be reversed. The reversing and releasing gear is of standard construction and its particular construction does not constitute a part of the present invention. The reversing and releasing mechanism is operated by a hand lever 27 arranged conveniently to the operator's seat 28. Arranged in the housing 16 is the drive shaft 29 which is directly connected to the engine crank shaft, and this shaft 29 is provided with longitudinally movable gears 31—32 of different diameter which are adapted to be moved into engagement respectively with the different diameter gears 33—34, secured to shafts 35—36, which are connected to the shafts 23—24 through the gear mechanisms 25—26. The gears of different diameter provide for different speeds of rotation of the pinions 7—8 with respect to the speed of the engine. The housing is closed by the cover plate 37 and contains a supply of lubricant for the various gears and bearings, so that all of the various gears are free from dirt and dust, a feature which is of great importance in a tractor.

The shaft or axle 4 projects from the frame 2 at opposite sides and on each projecting portion is a bushing or sleeve 38 upon which the sprocket is mounted. Mounted on the bushing 38 at each side of the sprocket are frames 41—42, which are held against transverse movement by the end plates 43—44 mounted on the axle 4. The frames 41—42 are formed with parallel upper and lower sides and rounded ends, the periphery of each frame being formed to constitute the outer ball race 45. The ball races are formed segmental in cross-section, their curvature being substantially the same as the curvature of the balls.

The frames 41—42 extend forwardly from the axle 4, and are suitably connected together forward of the axle, so that they, in effect, constitute a single frame. Arranged on each frame at the forward end of the parallel portions is a substantially vertical strut or brace 46. The struts on each frame are connected together by the yokes 47—48 through which passes a bolt 49 which also passes through two ears or lugs 51—52 secured to the frame 2. Surrounding the bolt 49, and arranged between the yoke 48 and the ear 52 is a helical spring 53, which is compressed as the forward ends of the frames 41—42 move upward with respect to the frame 2. The bolt holds the frames 41—42 in place against transverse movement, and the spring 53 allows the frames to rock slightly on the axle 4, so that the frame may accommodate itself to some extent to irregularities in the surface over which the tractor moves.

The forward curved portions of the frames 41—42 are formed separately and are pivoted to the main portion of the frames at their upper ends by the pin 54. The other or lower ends of the curved ends 55 are disposed in line with the lower forward ends of the main frames 41—42, so that a continuous ball race is formed. Arranged between the curved ends 55 and the main portion of the frames 41—42 is a helical spring 56 which is normally in compression and which tends to move the curved ends 55 outward about the pivot 54. Surrounding the frames 41—42 and arranged between the inner ball races 45 is an endless tractor chain composed of links 57 pivoted together.

Formed on each leg of the link, intermediate between its ends, are hollow bosses or projections 58, which extend outwardly on one side of the link only, that is, on that side which is remote from the sprocket. Disposed in these bosses are bolts 59, by which the tread plate is secured to the link and the legs of the link are preferably provided with depressions on their under sides to receive the nuts of the bolts. A tread section is attached to each link, each tread section consisting of an elongated base plate 62 arranged with its longer dimension transversely of the link, and having one of its longer edges flat and the other bent upward to overlie the flat edge of the adjacent plate on the next link. The base plate is also bent transversely, so that its shorter edges are raised above the body of the plate, and the plate is provided with apertures through which the bosses 58 extend. Overlying the base plate and secured thereto at the ends by rivets is the grouser or tread plate 61. The grouser is curved longitudinally or is formed with a curved face at its center, so that it firmly grips or engages the surface over which the tractor travels and insures traction on all surfaces, practically regardless of their condition. The high part of the curved plate is provided with depressions having holes in the bottom thereof through which the bolts 59 pass, the bolt heads being disposed in the depressions. The lower or under surface of the depressions bear against the upper ends of the bosses 58, so that the bosses and not the bolts take the strain produced as the tractor is moving. At that side of the tread section at which the base plate is flat at the edge, the side of the grouser slopes in a straight line to the base plate and meets the base plate at a distance from the edge thereof, to allow room for the overlapping edge of the adjacent base plate. At the other side the grouser is curved or flared so that the surface of the lower portion of that side is substantially parallel to the surface of the base plate, and this edge of the grouser contacts with the raised or upwardly curved portion of the base plate. Each tread section, therefore, presents a rounded transverse rib or projection which terminates or merges into the plane of the base plate at the side edges of the tread section. This arrangement presents the necessary supporting surface to the ground, so that the pressure per unit of area is small and at the same time presents a tread which secures a firm hold on the ground.

Secured to each base plate 62 at opposite sides thereof are sections of angle iron 63, which are rounded somewhat to form the outer race members. These angle sections are of substantially the same length as the width of the base plate, and partly overlie the ends of the hinge pins, holding them in place. The depending legs of the angle sections are slightly beveled on their ends, so that the chain may be flexed. Between the inner and outer ball races on opposite sides of the sprocket 5, are arranged a plurality of steel balls 64, the balls extending entirely around the ball races and forming an antifriction bearing for the tractor chain. The chain, supported at opposite sides on ball bearings, is engaged by the sprocket wheel 5, at that portion which is disposed in the concentric portion of the chain guide and driven around the stationary ball races. The spring 56, exerting an outward pressure on the movable segment 55 of the inner ball race, maintains the chain taut and compensates for any wear of the links or link pins.

The centrally ribbed or projecting tread plate is particularly advantageous in wet and muddy soils, and particularly soils of an adobe nature, which cling to the treads. The mud becomes embedded between the grousers as they are traveling over the ground, but as that section of the tread passes up over the curved portion of the tread guide, the grousers are spread apart, and in so spreading, loosen themselves from the packed mud and earth, which is dislodged and falls to the ground. By providing a limited space into which the mud packs and thereafter widening the space, means are provided for obtaining a substantially self-cleaning tread, a feature which is of great importance when the tractor is to be used on muddy surfaces.

When very muddy or saturated soils are encountered, such as for instance in rice fields, I find it advisable to attach auxiliary tread shoes to the grousers, in order that the bearing surface of the tread may be increased. These auxiliary shoes 65 are curved or bent transversely to coincide with the curvature of the grousers and are attached to the grousers by means of the bolts 59. The shoes 65 are considerably longer than the grousers, so that they project beyond the outer edge of the tread. The shoes are provided on their under faces with lugs which seat in the bolt head depressions in the grouser and are provided on their upper surfaces with depressions to receive the bolt head. In general practice, I have usually found that sufficient bearing surface is obtained by attaching the auxiliary shoes to each alternate grouser, although this arrangement may be varied in accordance with the circumstances of operation.

In Figs. 6 and 7 I have shown a modified form of tread section, the modification consisting in making the various parts of the section integral. The grouser, the base plate and the angle sections 63 are formed in one casting and the tread section thus formed is attached to the link by the bolts 59 in the same manner as in the previous construction. The construction of the section to accomplish the overlapping of the adjacent ends of the tread sections is shown in Fig. 7.

Secured to the forward end of the frame 2 is a frame 71 in which the supports for the steering wheel 72 are mounted. The frame 71 is provided with a horizontally disposed ring 73 which is provided on its inner surface with a ball race. Disposed within this ring 73 is a ring 74 having a ball race formed on its outer surface and in the ball races are a plurality of balls 75, which not only provide an antifriction bearing for the rotatable ring 74, but also prevent the vertical displacement of one ring with respect to the other. Secured to the inner ring 74 and overlying and closing the joint between the two rings is a drum 76, around which passes a cable 77 which also passes around a drum 78 which is connected to the hand wheel 79, rotation of the hand wheel serving to produce rotation of the inner ring 74.

Secured to the inner ring 74 and preferably formed integral therewith, are two depending brackets 81, which are provided with guides, in which are arranged the bearing blocks 82 of the steering wheel 72. Arranged between the guides and engaging the blocks 82 are compression springs 83, which relieve the forward end of the tractor of sudden jars. The brackets 81 are placed behind the center of the ring 74, so that the axle of wheel 72 lies behind the center of ring 74, and these brackets tend to remain in this position and hold the wheel 72 alined with the longitudinal axis of the machine.

In agricultural work the tractors usually run for long distances in a straight line and by arranging the steering wheel as described, the tractor has a tendency to travel in a straight line, thereby relieving the strain on on the operator to a large extent.

I claim:

1. In a tractor, a driving engine, endless movable tractor chains on opposite sides of said tractor, two alined transverse shafts each operatively connected to one of said tractor chains, two longitudinal shafts each connected to one of said transverse shafts, and a reversing mechanism between each longitudinal shaft and the engine.

2. In a tractor, a driving engine, endless movable tractor chains arranged at opposite sides of said tractor, sprockets engaging said chains, two alined transverse shafts each engaging one of said sprockets, two longitudinal shafts each connected to one of said transverse shafts, a reversing mechanism connected to each longitudinal shaft, and means including variable speed gears connecting said mechanisms with the engine.

3. In a tractor, a frame, an engine and endless movable tractor chains mounted on said frame, sprockets engaging said chains, transverse shafts engaging said sprockets, a closed casing secured to the frame in which said shafts are journaled, means independently connecting said shafts with the engine arranged in said casing, and a reversing mechanism in each of said independent means.

In testimony whereof, I have hereunto set my hand at San Francisco, California, this 28th day of July 1914.

CLARENCE A. HENNEUSE.

In presence of—
R. K. BARROWS,
AGNES BEHAN.